United States Patent Office 3,127,309
Patented Mar. 31, 1964

3,127,309
COMPOSITION AND METHOD FOR TREATING
DUTCH ELM DISEASE
Robert O. Zielinski, Rte. 2, Box 20, Delton, Mich.
No Drawing. Filed Nov. 29, 1961, Ser. No. 155,812
3 Claims. (Cl. 167—17)

This invention relates to a method of inhibiting diseases in trees, shrubs and herbaceous plants and to a composition of matter useful for this purpose. The composition and method are particularly useful in the prevention and treatment of Dutch elm disease, but are not specifically limited to treatment of elm trees alone as they can be used on other trees, shrubs and plants infected with diseases and beetles or worms.

For purposes of illustration there is disclosed herein the use of the present invention in connection with the treatment of elm trees for the Dutch elm disease. The use of the present invention in relation to Dutch elm disease is not a cure for advanced cases of this disease but has proved effective as a preventative in susceptible trees in which the disease is not apparent as well as a cure for the disease when found in its early stages in infected trees.

The value of the composition and method of this invention has been validated by studies of a practical field demonstration conducted in Michigan in an area containing forty-five elm trees. At the time of commencement of the treatment with the present composition, six of the elm trees were badly infected, and after the treatment, discussed more thoroughly below, four of these trees did not respond to the treatment due to the fact that the disease was in its advanced stages. Six months after the commencement of the treatment, the remaining badly infected elms were still alive and the disease appears to be at least halted with no further deterioration of the plant. The remaining trees are all located within an area having approximately a 350 foot radius. Under normal circumstances, it is well known that this disease spreads rapidly and the proximity of these trees would undoubtedly have resulted in the spread of the disease throughout the whole plot. The remaining trees were treated with the composition by the method herein disclosed and are healthy trees and show no sign of the disease in spite of their proximity to the badly infected trees. Additionally, three other elm trees showed infection in the early stages and upon receiving the treatment the infection has cleared up and they now appear to be very healthy trees. The treatment when applied to the slightly infected trees cured the disease in a period of about two weeks.

The following formula constitutes the composition of matter used in the present invention:

| | Percent |
|---|---|
| Magnesium sulfate | 32 |
| Magnesium carbonate | 32 |
| Sodium sesquicarbonate | 32 |
| Sodium lauryl sulfate | Trace |
| Lithium chloride | Trace |
| Potassium iodide | Trace |
| Minerals (such as used in stock feeds containing boron, manganese, magnesium, zinc, copper, iron, etc.) | 3 |

It should be noted that, in the above formula, the magnesium sulfate, magnesium carbonate and sodium sesquicarbonate are the disease destroying elements of the composition. The sodium lauryl sulfate, lithium chloride and potassium iodide are added to the formula as healing agents in order to promote the healing of the tree after the disease has been destroyed. Since these trees should also have a standard mineral treatment, such minerals have also been added as indicated above.

In the above discussed field test the trees were treated as follows. Eight ounces of the composition was used for each tree and this composition was placed in the ground in a manner such that it was able to reach the roots of the trees. Specifically, three circles were drawn about the tree; one at ten feet, a second at twenty feet and a third at thirty feet. A pointed bar or rod was used to create holes in the soil to a depth of five or six inches, approximately every five feet around each of the circles. One teaspoonful of the above composition was then placed in each of these holes and after filling all holes, the area was watered down well with a sprinkler. Care was taken not to flood the area so as to force the composition out of the holes.

Two weeks after the first treatment, a mixture comprising five pounds of agriculture bone meal, five pounds of cottonseed meal and five pounds of stock minerals was applied to the surface about the trees and wet down well. The purpose of this was to supply the trees with all the necessary minerals and nourishment needed to keep the tree fed during the growing season.

Four weeks after the first treatment, the trees were given the second treatment in the same manner as described above. The specific method of giving the treatment is illustrative only in that the composition may be placed in the ground at various other points so long as substantially all of the root system will have access to the composition so placed in the ground. While I do not claim that my invention will in all cases give an absolute cure for Dutch elm disease, it has been definitely demonstrated in field tests that beneficial results occur where the trees have been only recently infected with the disease. Additionally, it may be used as a preventative in susceptible trees in which the disease is not apparent.

It should be noted that the composition was absorbed into the tree system as a result of the treatment of the ground adjacent to the roots as described above. Upon investigation it was found that beetles were emerging from the treated trees. These beetles attracted birds to the trees as a result of absorption of the composition into the root of the trees.

I claim:
1. The method of inhibiting Dutch elm disease in susceptible trees which comprises impregnating the earth adjacent the roots of the trees with a composition of matter consisting essentially of magnesium sulfate, sodium sesquicarbonate, magnesium carbonate, sodium lauryl sulfate, lithium chloride and potassium iodide.
2. A composition of matter for inhibiting Dutch elm disease in trees consisting essentially of magnesium sulfate, magnesium carbonate, sodium sesquicarbonate, sodium lauryl sulfate, lithium chloride and potassium iodide.
3. A composition of matter for inhibiting Dutch elm disease in trees consisting essentially of equal parts of magnesium sulfate, magnesium carbonate and sodium sesquicarbonate and a trace of sodium lauryl sulfate, lithium chloride and potassium iodide.

References Cited in the file of this patent

Chem. Abstr., 2, 148(1), 1908.
Chem. Abstr., 5, 3116(6), 1911.
Chem. Abstr., 9, 3313(7), 1915.
Chem. Abstr., 11, 3303(7), 1917.
Chem. Abstr., 12, 2088(7), 2209(9), 1918.
Chem. Abstr., 14, 420(8), 1920.
Chem. Abstr., 16, 2368(2), 1922.
Chem. Abstr., 18, 1318(5), 1924.
Chem. Abstr., 19, 2688(7), 1925.
Chem. Abstr., 31, 7583(9), 1937.
Chem. Abstr., 32, 3909(9), 1938.
Chem. Abstr., 33, 7837(9), 1939.

(Other references on following page)

References Cited in the file of this patent

Chem. Abstr., 36, 1429(5), 1942.

Hackh's Chemical Dictionary, 3rd edition (1944), entries: "Lithium chloride," pp. 495–496; "Magnesium carbonate," p. 505; "Magnesium sulfate," p. 507; "Potassium iodide," p. 678; "Sesquicarbonate of soda," p. 767; "Sodium lauryl sulfate," p. 782, edited by Grant J., published 1944 by the Blakiston Company, Philadelphia, Pa.

Chem. Abstr., 40, 2928(2), 1946.
Chem. Abstr., 43, 8598(f), 1949.
Chem. Abstr., 44, 6997(g), 10256(e), 1950.
Chem. Abstr., 45, 3977(i), 1951.
Chem. Abstr., 46, 3270(i), 1952.
Chem. Abstr., 47, 1467(h), 1953.
Chem. Abstr., 48, 342(g), 10106(d), 5383(c), 1954.
Chem. Abstr., 49, 15151(h), 1955.